(12) United States Patent
Abe et al.

(10) Patent No.: US 8,708,386 B2
(45) Date of Patent: Apr. 29, 2014

(54) ASSIST GRIP FOR VEHICLE

(75) Inventors: Jun Abe, Takanezawa-machi (JP); Kazuya Matsuda, Niiza (JP)

(73) Assignee: Honda Access Corp., Niiza-shi (JP)

( * ) Notice: Subject to any disclaimer, the term of this patent is extended or adjusted under 35 U.S.C. 154(b) by 0 days.

(21) Appl. No.: 13/406,909

(22) Filed: Feb. 28, 2012

(65) Prior Publication Data
US 2013/0020821 A1    Jan. 24, 2013

(30) Foreign Application Priority Data

Jul. 20, 2011  (JP) .................................. 2011-159397

(51) Int. Cl.
*B60N 3/02*    (2006.01)
(52) U.S. Cl.
USPC ......................................................... 296/1.02
(58) Field of Classification Search
USPC ......... 296/1.02; 16/DIG. 12, 110.1, 412, 414, 16/421, 430; 49/460; 4/576.1
See application file for complete search history.

(56) References Cited

U.S. PATENT DOCUMENTS

| | | | | |
|---|---|---|---|---|
| 6,340,189 | B1* | 1/2002 | Pordy | 296/1.02 |
| 2008/0136208 | A1* | 6/2008 | Kuznarik et al. | 296/62 |
| 2008/0289296 | A1* | 11/2008 | Weber | 52/835 |
| 2011/0175386 | A1* | 7/2011 | Akaba | 296/1.02 |

FOREIGN PATENT DOCUMENTS

| | | |
|---|---|---|
| JP | 2002-114072 A | 4/2002 |
| JP | 2008-265581 A | 11/2008 |
| JP | 2008-296725 A | 12/2008 |

OTHER PUBLICATIONS

Japanese Office Action dated Apr. 9, 2013, issued in corresponding Japanese Patent Application No. 2011-159397 (2 pages).

* cited by examiner

*Primary Examiner* — Joseph Pape
*Assistant Examiner* — Dana Ivey
(74) *Attorney, Agent, or Firm* — Westerman, Hattori, Daniels & Adrian, LLP

(57) ABSTRACT

An assist grip for a vehicle to which a force can be easily applied from above when a passenger gets in and out of the vehicle, facilitating the movement of the passenger at that time. The assist grip includes a grip main body 4 vertically provided along a door opening of a vehicle 2. The grip main body 4 includes the grip head portion 6. The passenger can vertically apply a force to the grip head portion 6 when getting in and out of the vehicle, and thus he/she is allowed to easily get in and out of the vehicle. Moreover, a supporting member 5 is provided in the grip head portion 6 and an attachment position of the grip head is adjustable in relation to the grip main body 4, enabling the attachment position to be adjusted according to a passenger's physical size, further improving its convenience.

11 Claims, 12 Drawing Sheets

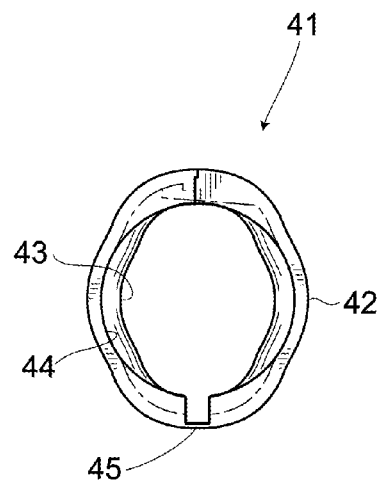 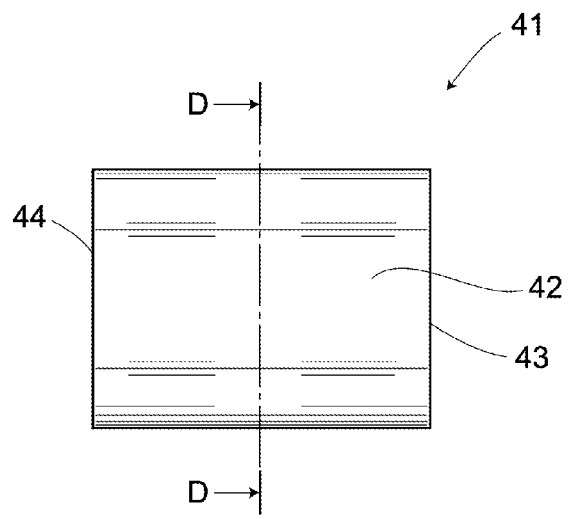
FIG.18A    FIG.18B
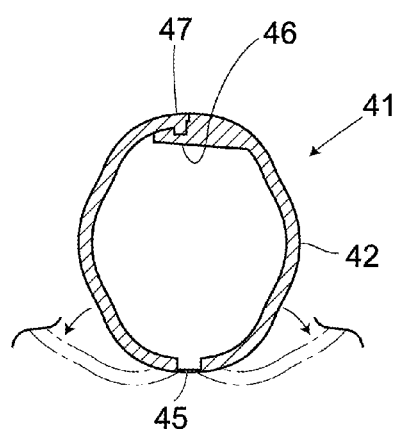
FIG.19

US 8,708,386 B2

ASSIST GRIP FOR VEHICLE

BACKGROUND OF THE INVENTION

1. Field of the invention

The present invention relates to an assist grip for a vehicle provided in a door opening of a vehicle.

2. Description of Related Art

Conventionally, there has been disclosed an assist grip structure which includes an assist grip in a vertical direction along a door opening provided in a side of a car. According to this structure, the assist grip is divided into upper and lower portions, and the upper portion is formed larger in diameter while the lower portion is formed smaller in diameter (e.g., Japanese Unexamined Patent Application Publication No. 2002-114072). Further, there has been disclosed a seat grip provided on an upper part of a backrest of a vehicle seat, and this seat grip includes a hand inserting grip adapted for inserting user's fingers thereinto, and a spherical grip formed of a member more flexible than that of the hand inserting grip (e.g., Japanese Unexamined Patent Application Publication No. 2008-296725).

According to the vertical assist grip as disclosed in the above-mentioned document (JP2002-114072), when a user's grip is weak or the friction of the hand is small, the assist grip becomes slippery and hard to grasp, leading to inferior usability.

On the other hand, according to the seat grip disclosed in the above-mentioned document (JP2008-296725), when a passenger gets through a passage inside a vehicle, the passenger can hold the spherical grip, or put a hand on the spherical grip, so that his/her body can be supported. The grip, however, is unsuitable for the passenger to get in and out of the vehicle through the door opening.

Moreover, since the installation heights of the grips proposed in both the documents stay fixed, both of these grips have a problem that the grips are hard to use for a short child and an adult taller than average.

SUMMARY OF THE INVENTION

In view of the above problems, it is an object of the present invention to provide an assist grip for a vehicle to which a force is easily applied from above to facilitate the movement of a passenger getting in and out of the vehicle.

In order to achieve the above object, a first aspect of the present invention is an assist grip for a vehicle including a grip main body provided vertically along a door opening provided in the vehicle, and a grip head portion provided in the grip main body.

According to a second aspect of the present invention, the grip head portion includes a supporting member, the supporting member being provided in a manner capable of being attached to an installation height adjustable in relation to the grip main body.

According to a third aspect of the present invention, the supporting member includes a horizontal portion to be attached to the grip main body, and an upwardly-extending portion provided at an end of the horizontal portion, the grip head portion being provided on a top of the upwardly-extending portion.

According to the assist grip for a vehicle described in the first aspect of the present invention, a passenger can vertically apply a force to the assist grip when he or she gets on or off using the grip head portion provided in the grip main body of the assist grip vertically provided, and thus the movement of the passenger getting in and out of the vehicle becomes easy.

According to the assist grip for a vehicle described in the second aspect of the present invention, an attachment position of the grip head portion is adjustable in relation to the grip main body of the assist grip, and therefore the attachment position of the grip head portion can be adapted to passenger's physical size, improving its convenience further.

According to an assist grip for a vehicle described in the third aspect of the present invention, the grip head portion can be arranged substantially parallel to the grip main body of the assist grip, and at the same time, in a position distant from the vertical bar to thereby enable an easy grasp thereof.

BRIEF DESCRIPTION OF THE DRAWINGS

FIG. 18A is a front view of a cover according to the first embodiment of the present invention.

FIG. 18B is a side view of the cover according to the first embodiment of the present invention.

FIG. 19 is a sectional view on a D-D line of FIG. 18B.

DESCRIPTION OF PREFERRED EMBODIMENTS

Figure 1:
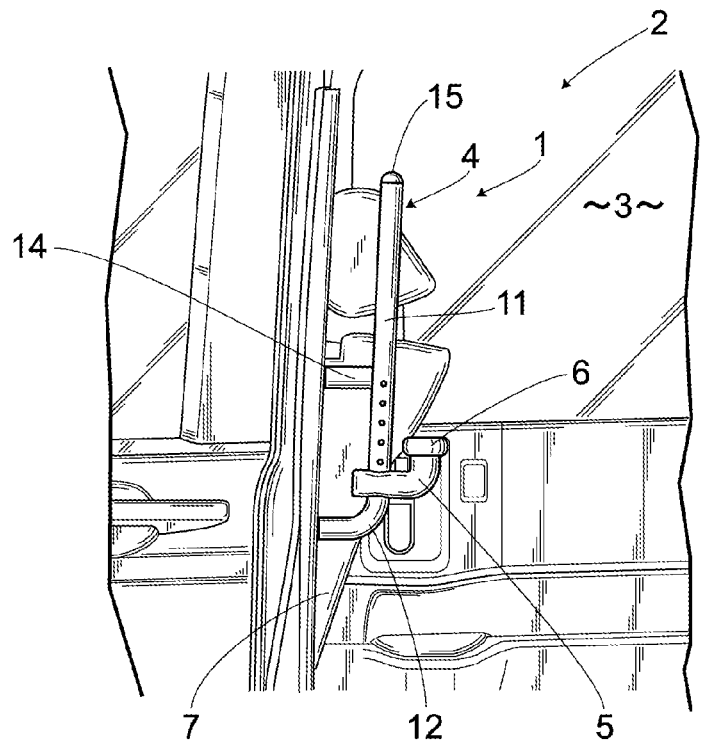
FIG. 1 is an overall perspective view seen from a side of a vehicle, showing a first embodiment of the present invention.
Figure 2:
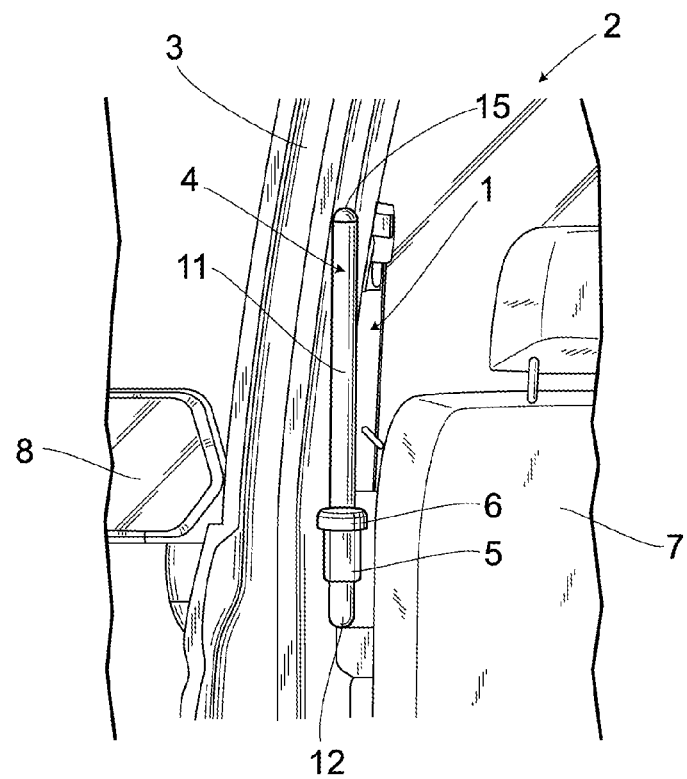
FIG. 2 is an overall perspective view seen from a rear side of the vehicle, showing the first embodiment of the present invention.
Figure 3:
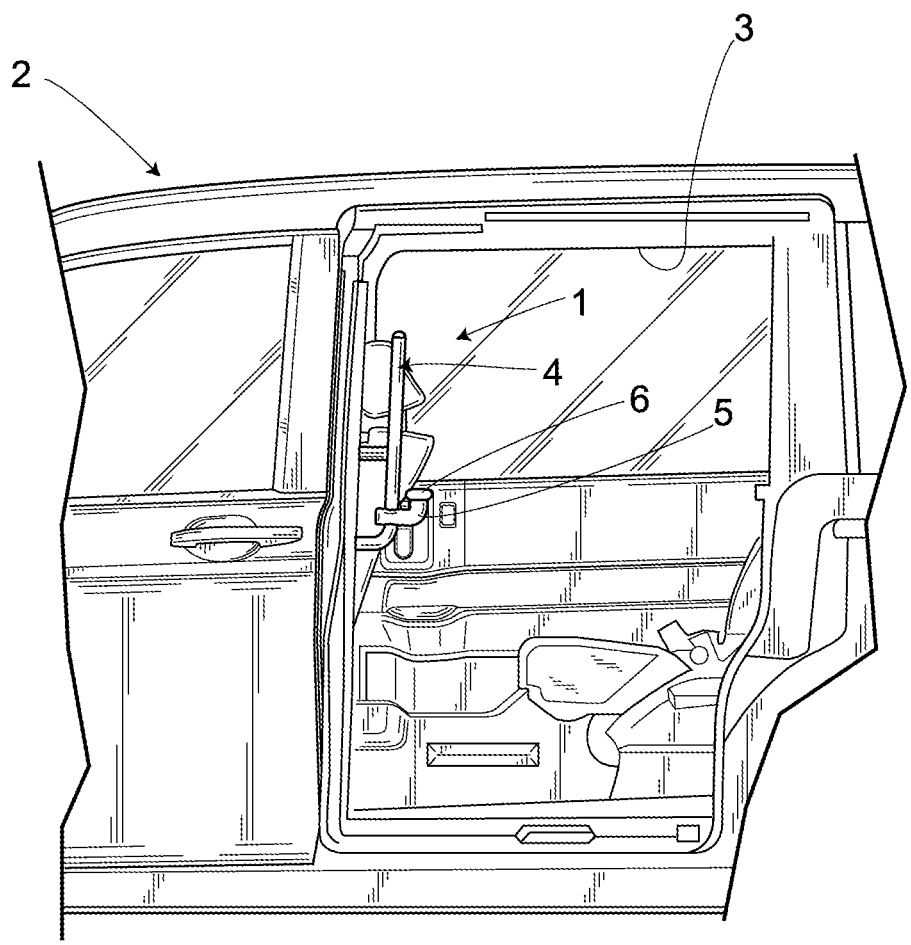
FIG. 3 is another overall perspective view seen from a side of a vehicle, showing the first embodiment of the present invention.
Figure 4A:
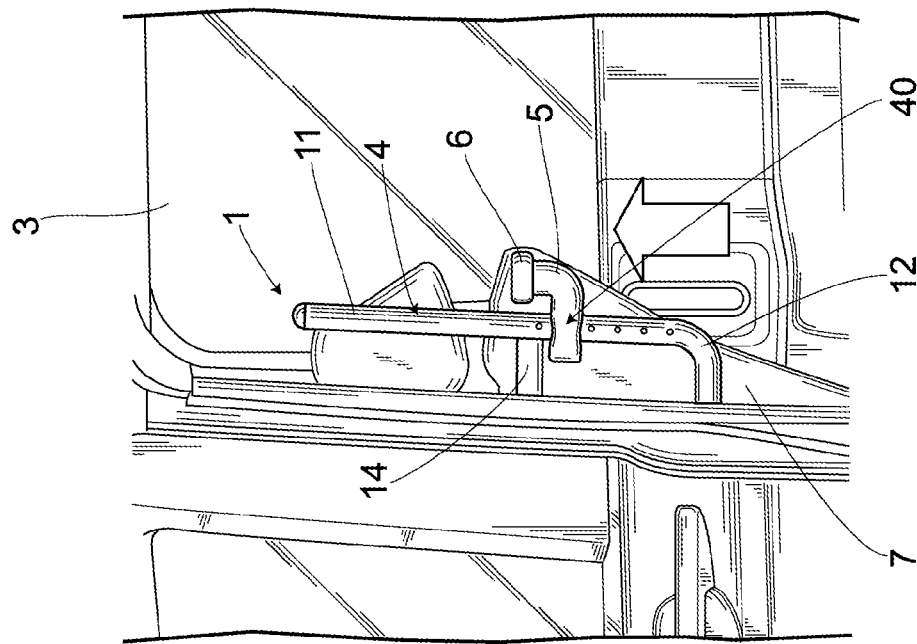
FIG. 4A is another overall perspective view seen from a side of a vehicle, showing a state in which a grip head portion is arranged on the downside, according to the first embodiment of the present invention.
Figure 4B:
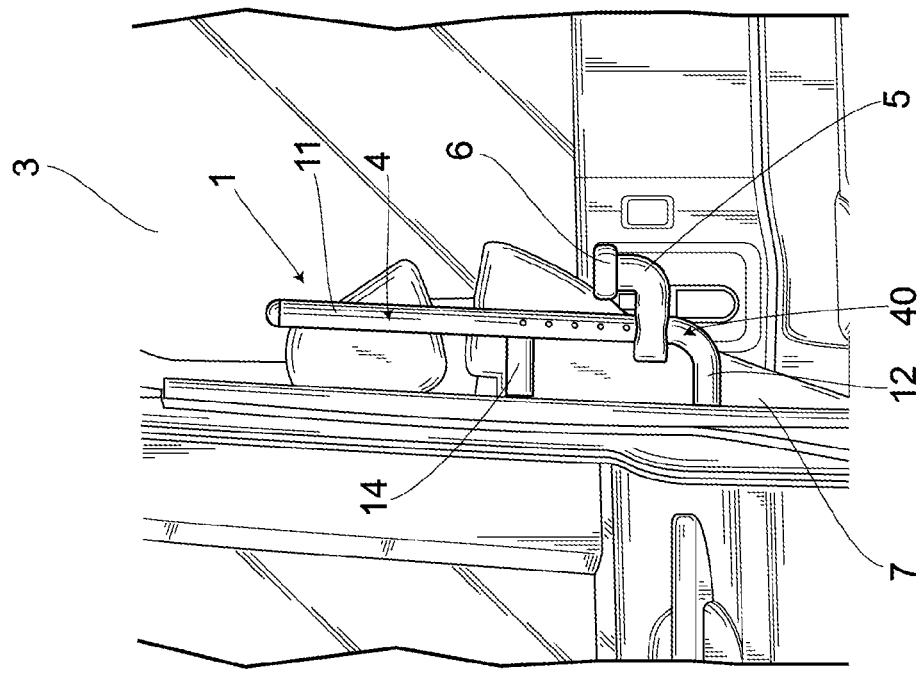
FIG. 4B is another overall perspective view seen from a side of a vehicle, showing a state in which the grip head portion is arranged on the upside, according to the first embodiment of the present invention.
Figure 5:
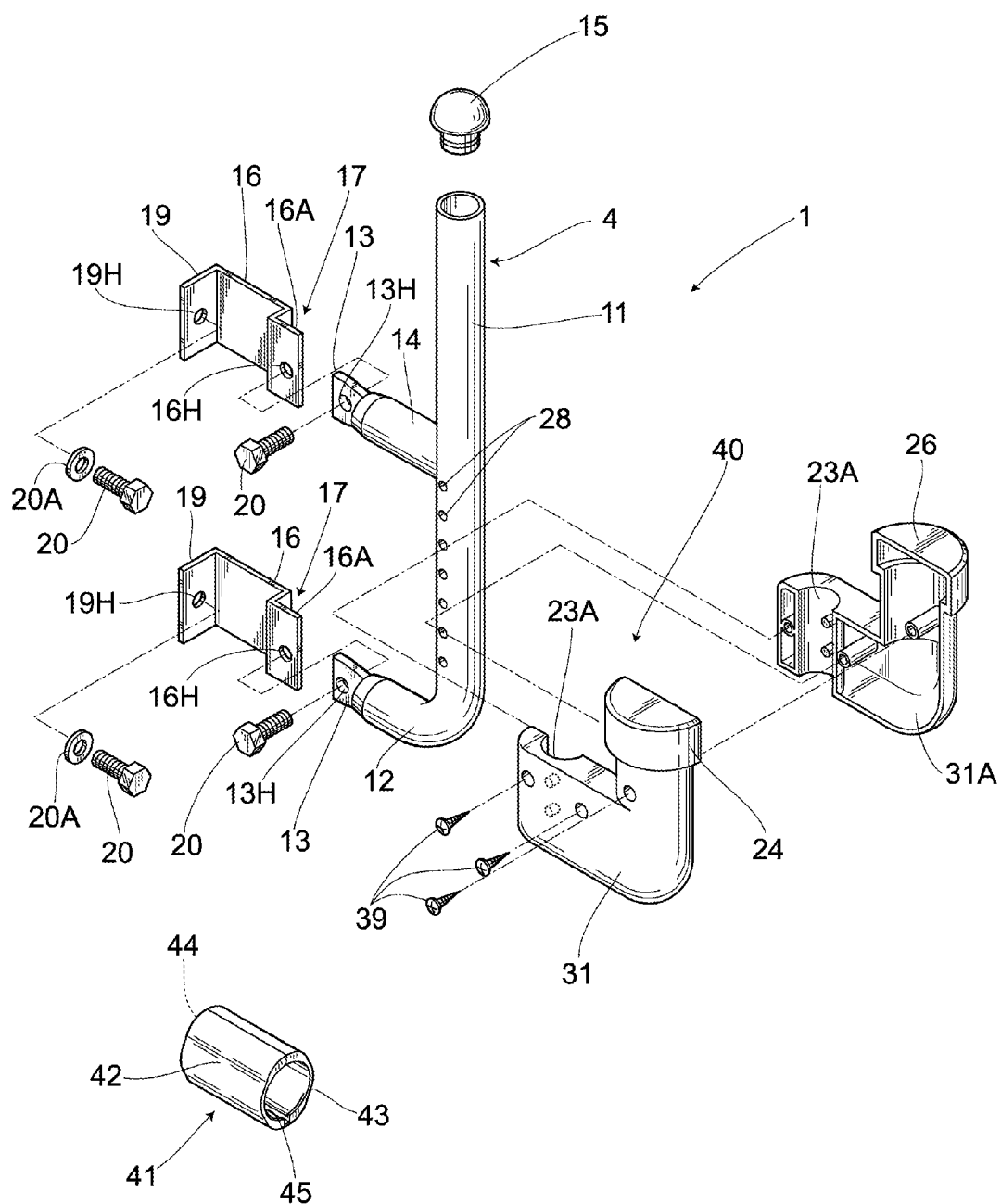
FIG. 5 is an explanatory exploded perspective view of an assist grip according to the first embodiment of the present invention.
Figure 6:
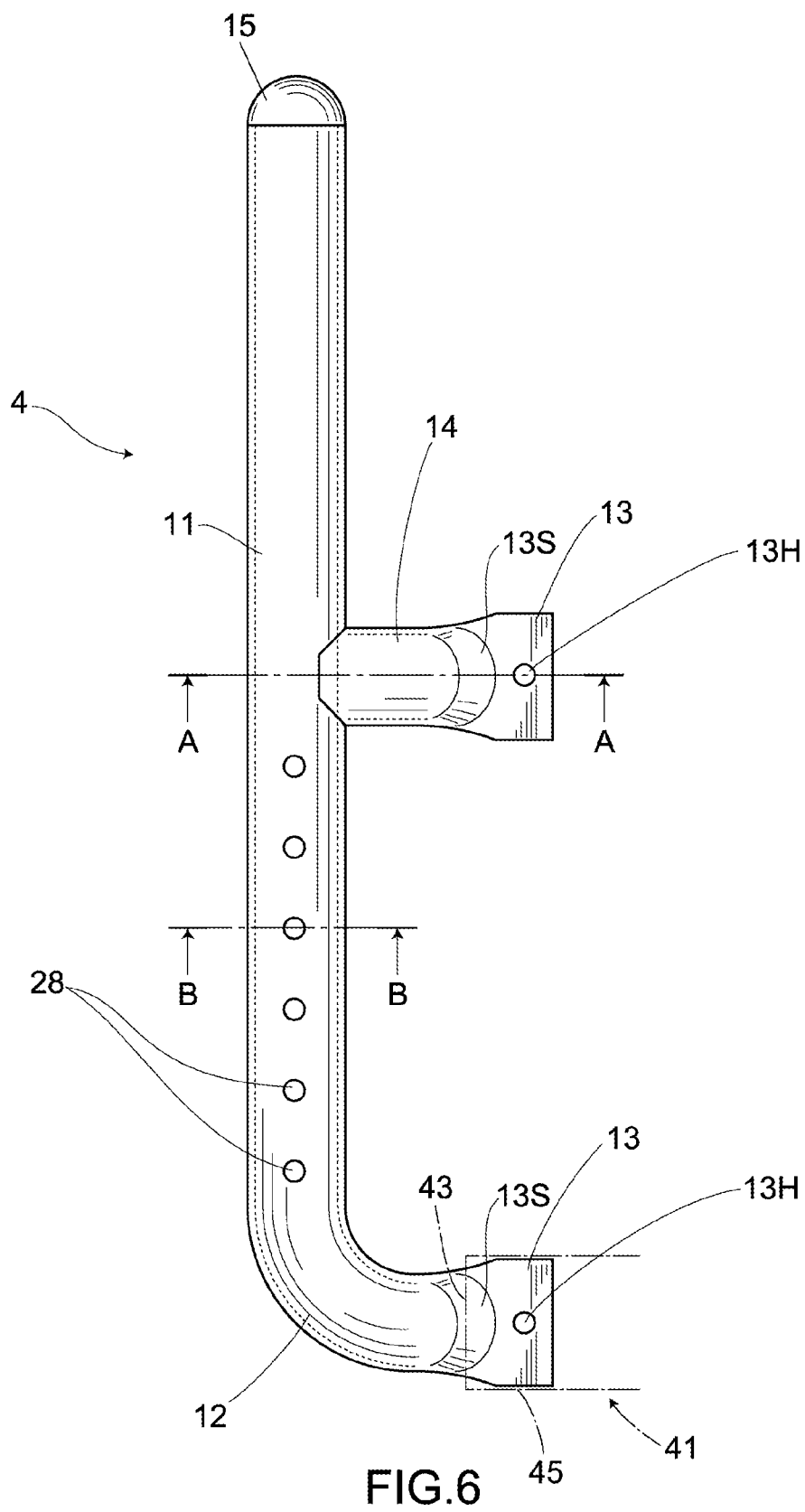
FIG. 6 is a side view of a grip main body of the assist grip according to the first embodiment of the present invention.

Embodiments of an assist grip for a vehicle of the present invention are described hereunder with reference to the accompanying drawings.

First Embodiment

As shown in FIG. 1 to FIG. 19, an assist grip 1 for a vehicle includes a vertical grip main body 4 provided in a door opening 3 on one side or the like of a vehicle 2 such as an automobile, and a grip head portion 6 provided integrally with a supporting member 5. Note that throughout the attached drawings, numeral symbol 7 shows a front seat, and numeral symbol 8 shows a side mirror provided outside the vehicle 2.

The grip main body 4 is made up of a metal hollow pipe material which is coated with a resin coating 4K on the outer surface thereof, and a bent portion 12 acting as a lower attaching portion is provided in the lower part of a vertical bar 11 vertically provided. The bent portion 12 is bent at about 90 degrees in a curved manner and has a flat part 13 at an end thereof. The flat part 13 is formed by pressing a pipe material in a horizontal direction, into a form of two overlapped flat sheets, and a through-hole 13H is formed in the flat part 13. In the meantime, a reduced part 13S is formed between the bent portion 12 and the flat part 13.

Figure 7:
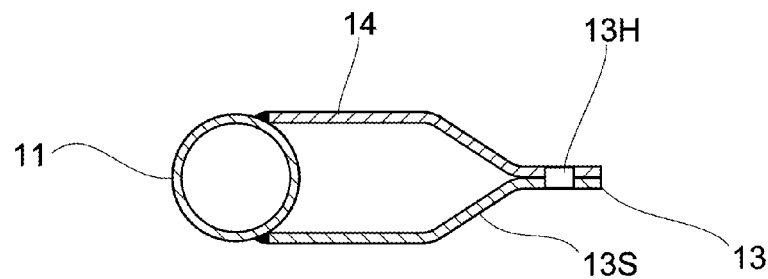
FIG. 7 is a sectional view on an A-A line of FIG. 6.

Moreover, a horizontal portion 14 acting as an upper attaching portion is connected to the substantially central position in a height direction of the vertical bar portion 11 by welding or the like. The horizontal portion 14 is arranged in the same direction as that of the bent portion 12, and the flat part 13 is provided at the end of the horizontal portion 14. A through-hole 13H is bored in the flat part 13. In addition, FIG. 7 shows a sectional view before applying a resin coating 4K.

An opening of an upper end of the vertical bar portion 11 is closed by a cap 15 acting as a lid, and the cap 15 is formed in a substantially hemisphere shape.

The grip main body 4 is attached to the vehicle 2 with a bracket 16. The bracket 16 is formed by bending a metallic plate material, and is formed with a stepped part 17 at first end 16A side. The first end 16A is parallel to the central part of the bracket 16, and a through-hole 16H is formed at the first end 16A. The female screw part 18M communicating with the through-hole 16H is provided by e.g., welding a nut 18 firmly to the end 16A. Further, the bracket 16 is formed with a bent portion 19 which is formed by bending the bracket 16 about 90 degrees toward the second end side, and a through-hole 19H is formed in the bent portion 19.

Then, with the bent portion 12 and the horizontal portion 14 thus structured, a first side of the first end 16A of the bracket 16 is fixed to the flat part 13 by penetrating a bolt 20 through the through-hole 13H of the flat part 13 and then screwing the bolt 20 through the through-hole 16H into the female screw part 18M. On the other hand, at the second side of the bracket 16, a bolt 20 is penetrated through the through-hole 19H from one side and then fixing the bolt 20 to the vehicle 2, and thus the bracket 16 is fixed to the vehicle 2. In this way, the grip main body 4 can be attached to along the door opening 3. Alternatively, a washer 20A, together with the bolt 20, may be used.

Figure 10:
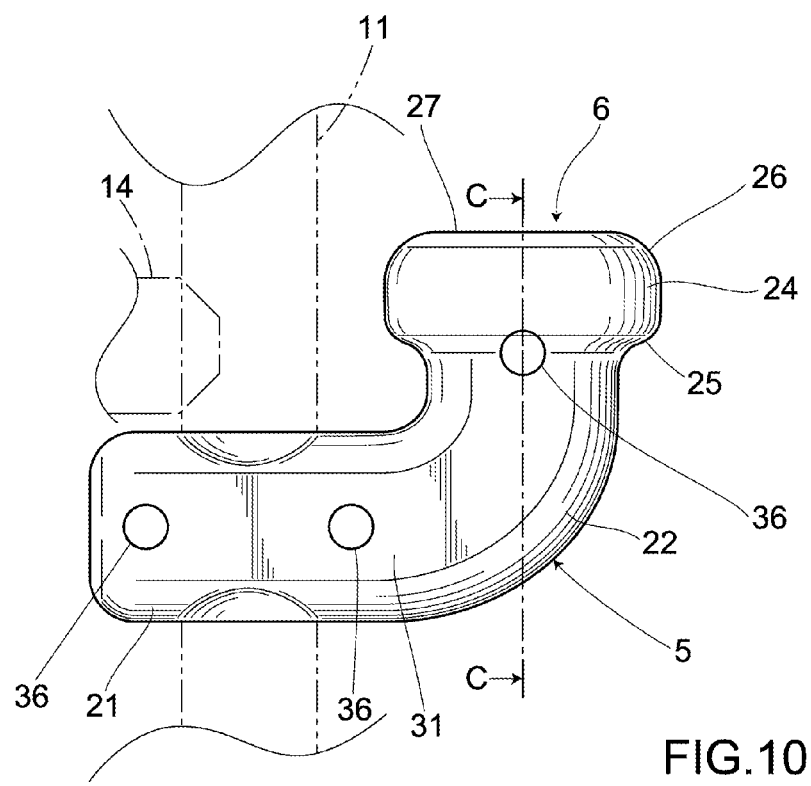
FIG. 10 is a side view of a supporting member provided with the grip head portion according to the first embodiment of the present invention.

Next is a description of a structure of the grip head portion 6 integrated with the supporting member 5. The grip head portion 6 integrated with the supporting member 5, as shown in FIG. 10, etc, is made of a synthetic resin. The supporting member 5 includes: a horizontal portion 21 which is externally mounted on and is fixed to the vertical bar portion 11; and a curved portion 22 provided at an end of the horizontal portion 21. The grip head portion 6 provided in the upper end of the curved portion 22 is integrated with the supporting member 5. A hole 23 for fitting onto the vertical bar portion 11 is vertically formed in the horizontal portion 21. Note that the grip head portion 6 is arranged on an opposite side to the horizontal portion 14 when it is in an attached state. An outer periphery 24 of the grip head portion 6 is formed into a cylindrical surface extending around a vertical center line, and this outer periphery 24 is formed larger in cross section than the outer periphery of the curved portion 22. The curved portion 22 and the outer periphery 24 are connected to each other via a lower convexly-curved surface 25. On the other hand, an upper surface 27 of the grip head portion 6 is formed into a substantially horizontal and flat surface, or otherwise, a convexly-curved surface, and the upper surface 27 and the outer periphery 24 are connected to each other via an upper convexly-curved surface 26. Note that the central line of the grip head portion 6 is vertically formed so as to be substantially parallel to the central line of the vertical bar portion 11, and that the upper surface 27, which is the upper end of the grip head portion 6, is a free end that is not fixed to any other support members.

Figure 8:
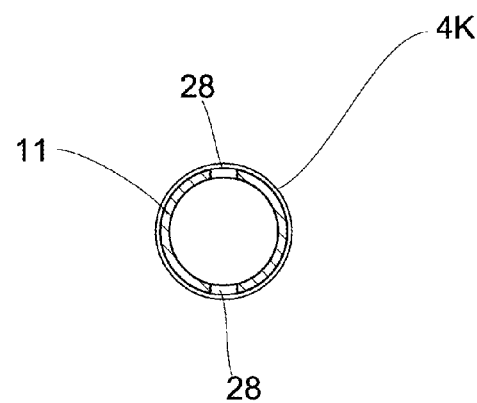
FIG. 8 is a sectional view on a B-B line of FIG. 6.
Figure 9:
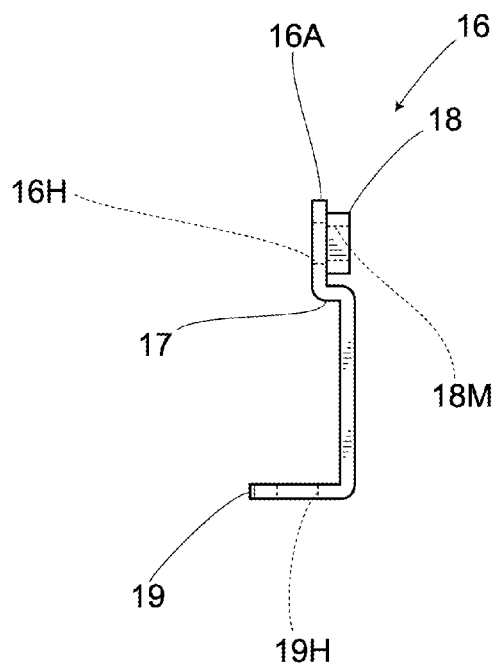
FIG. 9 is a plan view of a bracket for attaching the grip main body of the assist grip to the vehicle according to the first embodiment of the present invention.

In order to adjust the attachment position of the supporting member 5, a plurality of equally-spaced positioning through-holes 28 are formed vertically in the vertical bar portion 11. As shown in FIG. 8, the positioning through-holes 28 are paired in the same height position, and a virtual line which connects these paired positioning through-holes 28, 28 passes the center of the vertical bar portion 11.

The supporting member 5 is made up of hollow separate pieces 31, 31A which are separated by a plane passing a center line of the support member 5, and a plurality of reinforcement ribs 32, 33 are provided in a manner crossing each other in vertical and horizontal directions, respectively. The separate pieces 31, 31A have the cutouts 23A, 23A formed by halving the hole 23, respectively. There are positioning projections 34, 34 formed at upper and lower positions in the cutouts 23A, 23A on the inside surfaces of these separate pieces 31, 31A. These positioning projections 34, 34 are arranged at upper and lower positions, corresponding to the positioning through-holes 28. These positioning projections 34 are each formed in a tapered hollow pipe shape which is open at its tip end, and are inserted into the positioning through-holes 28. Note that the supporting member 5 is formed from synthetic resin, such as, for example, HPP resin etc, and that in FIG. 5 as an explanatory exploded perspective view, and the reinforcement ribs 32, 33 etc. are not shown.

Hollow and tubular boss parts 35, 35, and 35 are provided in a projecting manner at either side of the cutout 23A and a lower position of the grip head portion 6 on the inside surface of the separate piece 31A, respectively. Cylindrical portions 36 for screwing are provided in a projecting manner corresponding to these boss parts 35 in the inside surface of the separate piece 31, and each of these cylindrical portions 36 for screwing is open on an outer surface of the separate piece 31, having a through-hole 37H formed through a bottom face 37 of each cylindrical portion 36.

An inner stepped edge 38 serving as a first fitting portion is formed in the edge of the separate piece 31, while an outer stepped edge 38A serving as a second fitting portion which fits to the inner stepped edge 38 is formed in the edge of the separate piece 31A.

Then, when the supporting member 5 is attached to the vertical bar portion 11, the supporting member 5 is separated into the separate pieces 31, 31A, and the positioning projections 34, 34 of the separate pieces 31, 31A are pressed into the positioning through-holes 28, 28 at a predetermined height position, while the inner stepped edge 38 is fitted in the outer stepped edge 38A.

Figure 11:
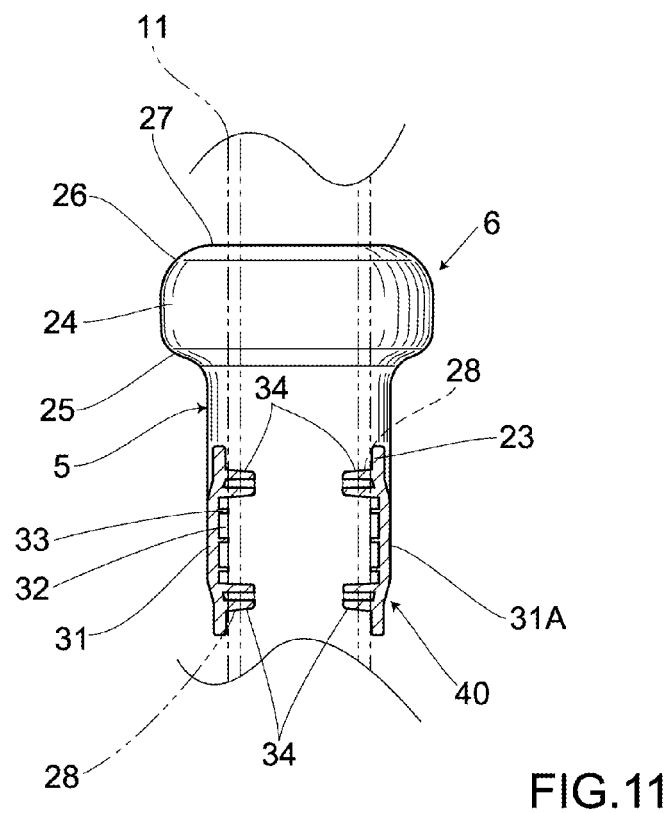
FIG. 11 is a front view of the supporting member provided with the grip head portion according to the first embodiment of the present invention.
Figure 12:
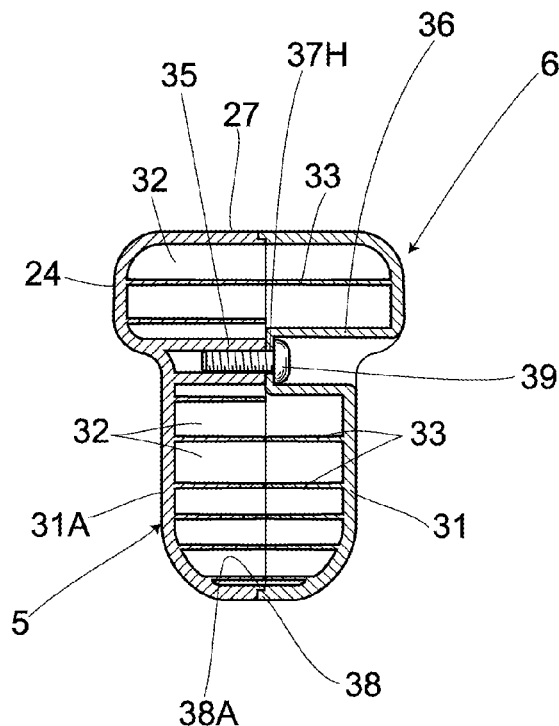
FIG. 12 is a sectional view on C-C line of FIG. 10.
Figure 13:
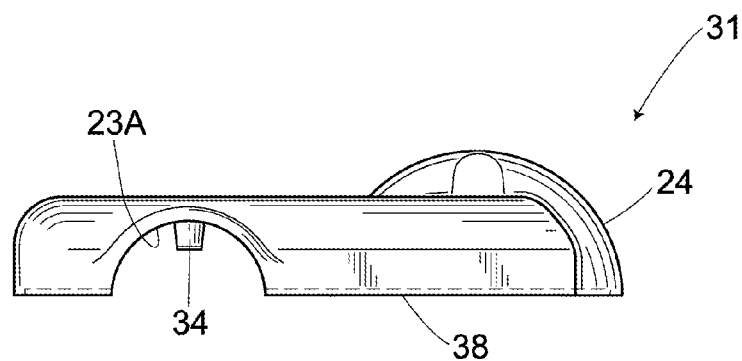
FIG. 13 is a bottom plan view of a first separate piece according to the first embodiment of the present invention.
Figure 14:
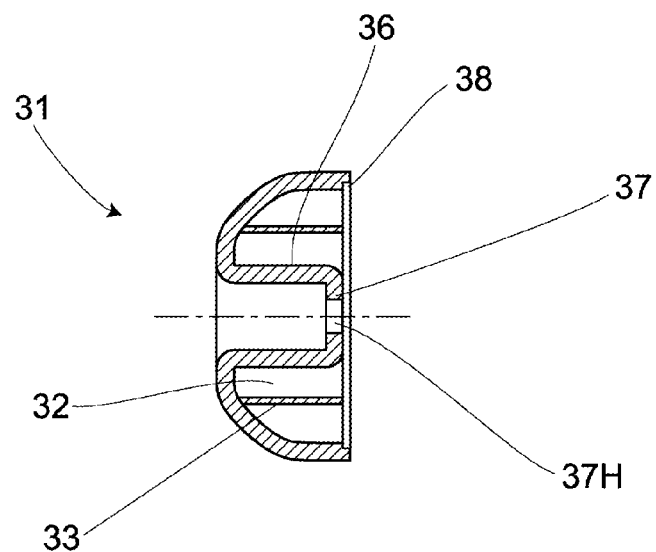
FIG. 14 is a sectional view of a main part of a horizontal portion of the first separate piece according to the first embodiment of the present invention.
Figure 15:
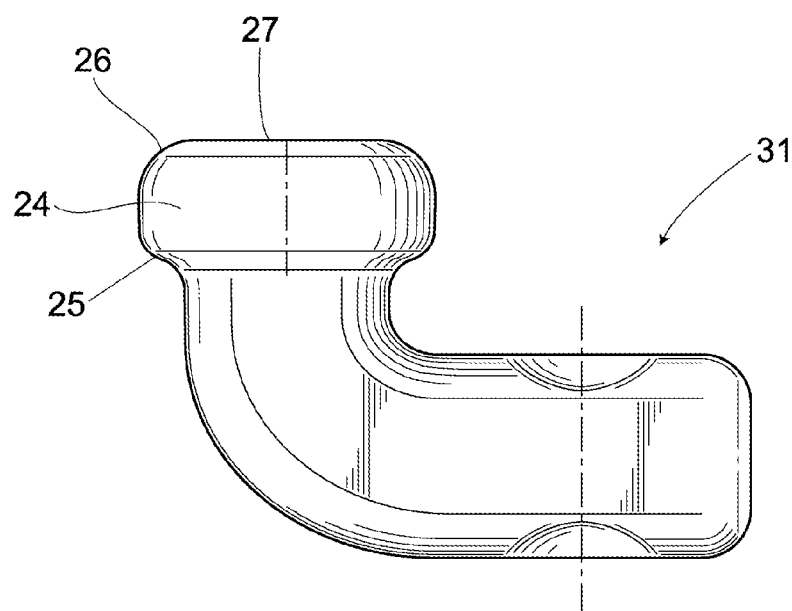
FIG. 15 is a side view of a second separate piece according to the first embodiment of the present invention.
Figure 16:
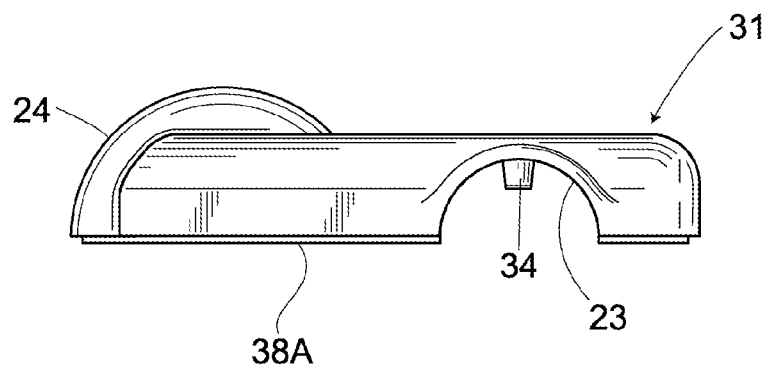
FIG. 16 is a bottom plan view of the second separate piece according to the first embodiment of the present invention.
Figure 17:
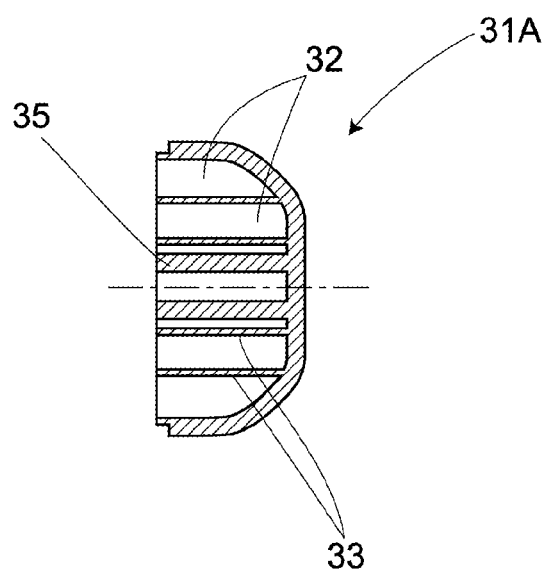
FIG. 17 is a sectional view of a main part of a horizontal portion of the second separate piece according to the first embodiment of the present invention.

As a result, the vertical bar portion 11 is externally mounted with the supporting member 5, and the upper and lower portions of the hole 23 are allowed to come in substantially contact with the outer surface of the vertical bar portion 11 as shown in FIG. 11. Moreover, when the boss parts 35 and the cylindrical portions 36 for screwing are aligned with each other, and a screw 39 is allowed to penetrate into each through-hole 37H through the cylindrical portions 36 to thereby be screwed into the boss part 35. Accordingly, the separate pieces 31, 31A can be united and the supporting member 5 can be fixed to the vertical bar portion 11. In the meantime, although a female screw thread is not formed in the boss part 35 at the time of molding, the screw 39 is screwed into the boss part 35 by a screwing operation.

It should be noted that changing the positioning through-holes 28, 28 into which the positioning projections 34, 34 are pressed enable the height position of the grip head portion 6 to be adjusted in relation to the grip main body 4, thus allowing the positioning through-holes 28 of the vertical bar portion 11, the separate pieces 31, 31A, and the positioning projections 34 etc. to constitute a height adjustment unit 40 of the supporting member 5.

Moreover, as shown in FIGS. 18 and 19, the assist grip 1 for vehicle according to the present invention further includes a cylindrical cover 41 which covers the flat part 13 and the bracket 16. The cover 41 is made of a synthetic resin, etc., and includes a tubular section 42 which is longitudinally elongated and has a substantially ellipse shape; an elongate hole edge 43 provided in a first end of the tubular section 42; and a circular edge 44 provided in a second end of the tubular section 42. The elongate hole edge 43 and the circular edge 44 are formed in an inwardly expanding manner at the end of the tubular section 42, while the opening of the elongate hole edge 43 has a vertically long shape, corresponding to the reduced part 13S so that the reduced part 13S may be inserted thereinto. The opening of the circular edge 44 is circular-shaped so that the bent portion of the bracket 16 attached to the vehicle 2 is inserted thereinto. Moreover, a hinge part 45 made of a thinned portion thinner than other portions in the circumferential direction is formed in a lower part of the cover 41 in the cross section, whereas, the cross-sectional upper part of the cover 41 is divided, and forms a fitting reception part 46 in a first side edge and a fitting part 47 in the second side edge, whereby the reception part 46 and fitting part 47 are allowed to be fitted together. Accordingly, externally fitting the cover 41 onto the bracket 16 from its lower part enables the bracket 16 to be unexposed to the external. Note that it is not necessary to form the fitting reception part 46 and fitting part 47 over an entire length of the cover 41, but it suffices to form them in at least a part of the cover 41. Here, the cover 41 is provided in the bent part 12 and the horizontal portion 14, respectively.

Next is an explanation of how to use the assist grip 1. First, the grip head portion 6 is attached according to the physique of a passenger who uses the assist grip 1. When the passenger gets in and out of a vehicle, the passenger can grasp the grip head portion 6 from above while shifting his/her weight onto the grip head portion 6, thus enabling the passenger to get in and out of a vehicle more easily with a less gripping force than is needed in the case where the passenger grasp the vertical bar portion 11. Also, since the height adjustment unit 40 can adjust the height of the grip head portion 6, both a short child and a tall adult can adjust the grip head portion 6 to a position where he/she can easily use it.

As described above, with respect to the first aspect of the present invention, there is provided the assist grip 1 for a vehicle including: the grip main body 4 vertically provided along the door opening 3 provided in the vehicle 2 for a passenger to get in and out of the vehicle therethrough; and the grip head portion 6 provided in the grip main body 4, and thus a passenger can vertically apply a force on the occasion of getting in and out of the vehicle 2, enabling the passenger to get in and out of the vehicle 2 more easily.

With respect to the second aspect of the present invention, the grip head portion 6 includes the supporting member 5, and the supporting member 5 is provided in a manner capable of being attached to an installation height adjustable in relation to the grip main body 4. Accordingly, the attachment position of the grip head portion 6 becomes adjustable in relation to the grip main body 4, thus enabling the attachment position of the grip head portion 6 to be adapted to a passenger's physical size, leading to further improved convenience.

With respect to the third aspect of the present invention, the supporting member 5 includes the horizontal portion 21 to be attached to the grip main body 4 and the upwardly-extending curved portion 22 provided at the end of the horizontal portion 21, and the grip head portion 6 is provided on the top of the upwardly-extending curved portion 22. Accordingly, the grip head portion 6 can be arranged substantially parallel to the grip main body 4, and at the same time, in a position distant from the vertical bar 11 where the grip head portion 6 is easy to grasp.

Moreover, as an effect specific to the embodiment, since the supporting member 5 is attached to a portion of the vertical bar portion 11 between the bent part 12 and the horizontal portion 14, even if a load is applied to the grip head portion 6, the grip head portion 6 can be stably supported by the bent part 12 and the horizontal portion 14 which are provided in the upper and lower sides. Furthermore, since the horizontal portion 21 is fixed to the vertical bar portion 11 by externally fitting the same thereonto, there can be obtained a strongly fixed structure against a load.

Furthermore, the grip head portion 6 is configured so as to be easy to grasp, because the curved portion 22 and the outer periphery 24 are connected at a lower side of the grip head portion 6 by the lower convexly-curved surface 25, and the upper surface 27 and the outer periphery 24 are connected at an upper side of the grip head portion 6 by the upper convexly-curved surface 26.

Moreover, since the separate pieces 31, 31A of the supporting member 5 are fixedly attached to the vertical bar portion 11 by clamping the vertical bar portion 11 therebetween, the grip head portion 6 can be attached simply and firmly. Furthermore, since the height adjustment unit 40 of the supporting member 5 is made up of the positioning through-holes 28 of the vertical bar portion 11, the separate pieces 31, 31A, and the positioning projection 34, etc., the height position of the grip head portion 6 can be changed simply by disassembling and then reattaching the support member 5.

Furthermore, the grip main body 4 can be attached to the vehicle 2 simply through the bracket 16, and besides the bracket 16, etc. are not exposed to the external by applying the cover 41 to the bracket 16 as an outer covering.

Second Embodiment

Figure 20:
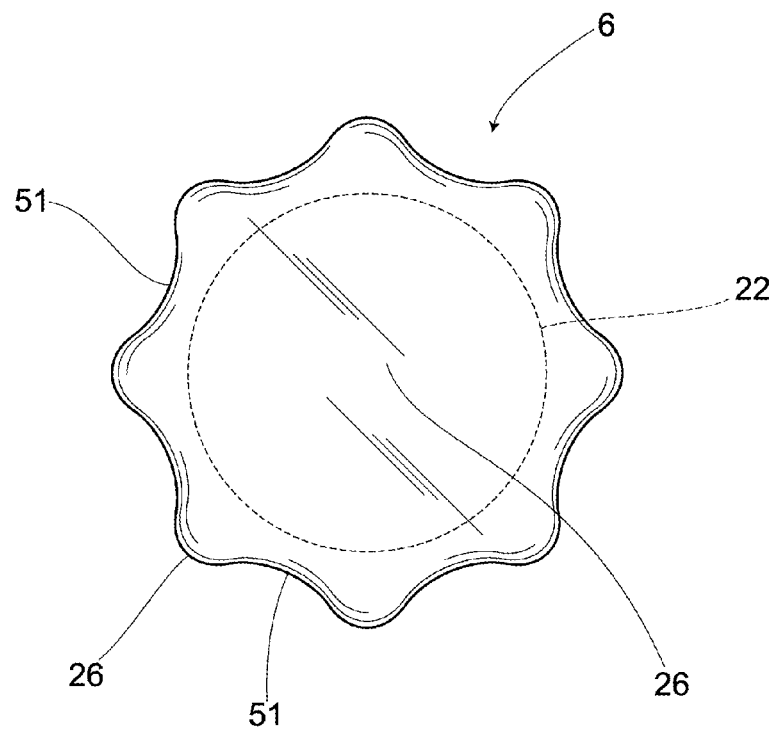
FIG. 20 is a plan view of the grip head portion, according to a second embodiment of the present invention.

FIG. 20 shows a second embodiment of the invention, and an explanation thereof is given with the same reference numbers attached to the same portion as in the first embodiment. In this embodiment, one modification of the grip head portion 6 is shown, in which a plurality of groove portions 51 extending in a lengthwise direction are formed on the outer periphery 24 of the grip head portion 6 at substantially regular intervals in the circumference direction.

Therefore, a user can grasp the grip head portion 6 with his/her fingers kept from slipping and can obtain stable usability, by putting his/her hand on the grip head portion 6 from above, and grasping the grip head portion 6 so that fingers are caught in the groove portions 51.

Thus, this embodiment can realize equivalent functions and effects as those realized by the first embodiment of the invention.

Third Embodiment

Figure 21:
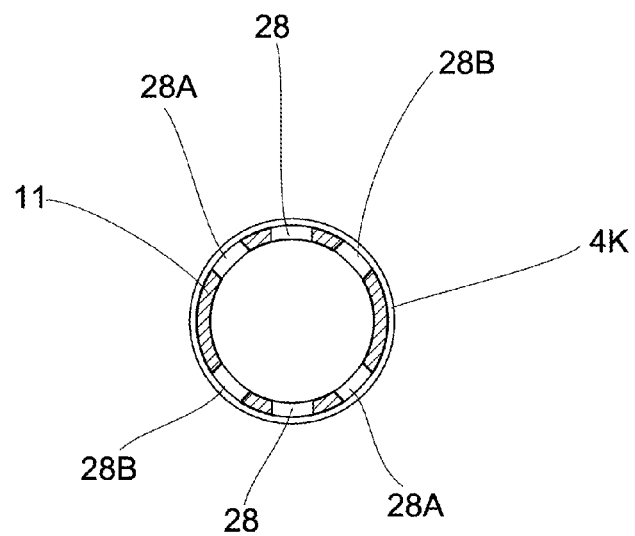
FIG. 21 is a sectional view of a main part of a rotation position adjustment unit, according to a third embodiment of the present invention.

FIG. 21 shows a third embodiment of the invention, and an explanation thereof is given with the same reference symbols appended to the same portions as those in each of the above-mentioned embodiments. In this embodiment, a plane position of the grip head portion 6 in relation to the vertical bar portion 11 of the grip main body 4 is allowed to be adjustable. Specifically, this embodiment further includes a rotation position adjustment unit, serving as a means for adjusting a plane position, to adjust the rotation position of the grip head portion 6 around the vertical bar portion 11. The rotation position adjustment unit is made up of paired positioning through-holes 28A, 28A, paired positioning through-holes 28B, 28B that are bored at circumferential intervals between the paired positioning through-hole 28, 28, as well as the separate pieces 31 and 31A, and the positioning projections 34.

Accordingly, choosing any of the positioning through-holes 28, 28A, and 28B into which the positioning projection 34 is pressed, the rotation position around the vertical bar portion 11 of the grip head portion 6 can be adjusted to the position where a passenger can easily use the same.

Thus, this embodiment also has equivalent functions and effects as the first embodiment of the invention.

As described above, since the present embodiment includes the rotation position adjusting unit as the unit for adjusting the plane position, the plane position of the grip head portion 6 can be adjusted to the position where a passenger can easily use the grip head portion 6.

In the meantime, the present invention is not limited to the foregoing embodiments, and various modifications are possible within the range of the gist of the invention. For example, as long as adjustment of the height of the grip head portion is possible, any other various structures may be used for the height adjustment unit. Moreover, although the substantially round one in plain view is proposed as the grip head portion in the first embodiment, any other various ones may be used such as a substantially quadrangular or triangular one, as long as they are easy for a user to grasp. Furthermore, although the grip head portion integrated with the supporting member is divided in the foregoing embodiments, only the supporting member fixed to the vertical bar portion may be divided, and the grip head portion may be formed in one-piece structure, such that the one-piece grip head portion is fixed to the supporting member after fixing the supporting member to the vertical bar portion. Alternatively, the horizontal portion of the grip main body may be provided with the supporting member.

What is claimed is:

1. An assist grip for a vehicle, comprising:
    a grip main body having a longitudinal axis extending vertically along a door opening provided in the vehicle, and
    a supporting member which is attachable to said grip main body at an adjustable installation height, said supporting member having a grip head portion formed thereon,
    wherein said supporting member further comprises
        a horizontal portion to be attached to said grip main body; and
        an upwardly-extending portion provided at an end of said horizontal portion, said grip head portion being provided on a top of said upwardly-extending portion.

2. The assist grip for a vehicle according to claim 1,
    wherein said main grip body includes a vertical bar portion,
    wherein said horizontal portion of said supporting member includes a hole for fitting said horizontal portion of said supporting member onto the vertical bar portion of the main grip body, and
    wherein an axis of said hole in said horizontal portion is perpendicular to a longitudinal axis of said horizontal portion.

3. The assist grip for a vehicle according to claim 2,
    wherein said vertical bar portion of main grip body includes a plurality of positioning through-holes, the plurality of positioning through-holes being equally-spaced in a longitudinal direction of said main grip body,
    wherein said plurality of positioning through-holes allow adjustment of an attachment position of said supporting member to said main grip body, and
    wherein said supporting member comprises at least two separate pieces which clamp said vertical bar portion therebetween.

4. The assist grip for a vehicle according to claim 3, wherein an inside surface of each of said at least two separate pieces of said supporting member includes a positioning projection to be inserted into said positioning through-holes.

5. The assist grip for a vehicle according to claim 4, wherein the inside surface of each of said at least two separate pieces of said supporting member includes two positioning projections arranged vertically along the axis of said hole in said horizontal portion.

6. The assist grip for a vehicle according to claim 3, wherein said at least two separate pieces are fixable to each other by a screw, said screw passing through said vertical bar portion when said supporting member is disposed on said grip main body.

7. The assist grip for a vehicle according to claim 1,
    wherein said grip head portion includes a cylindrical outer periphery and an upper surface, and
    wherein said upper surface and said cylindrical outer periphery are connected to each other by a convexly-curved surface.

8. The assist grip for a vehicle according to claim 1,
    wherein said grip head portion includes a cylindrical outer periphery and an upper surface,
    wherein said cylindrical outer periphery has a larger cross-sectional area than said upwardly-extending portion,
    wherein said upper surface and said cylindrical outer periphery are connected to each other by a first convexly-curved surface, and
    wherein said upwardly-extending portion and said cylindrical outer periphery are connected to each other by a second convexly-curved surface.

9. The assist grip for a vehicle according to claim 1, wherein said grip head portion is arranged substantially parallel to said grip main body.

10. An assist grip for a vehicle, comprising:
- a grip main body having a longitudinal axis extending vertically along a door opening provided in the vehicle,
- a supporting member which is attachable to said grip main body at an adjustable installation height, said supporting member having a grip head portion formed thereon, and
- a plane position adjustment unit for adjusting a plane position of said grip head portion in relation to said grip main body.

11. The assist grip for a vehicle according to claim 10, wherein said plane position adjustment unit acts as a rotation position adjustment unit to adjust a rotation position of said grip head portion around said vertical bar portion of said grip main body.

\* \* \* \* \*